Figure 1:
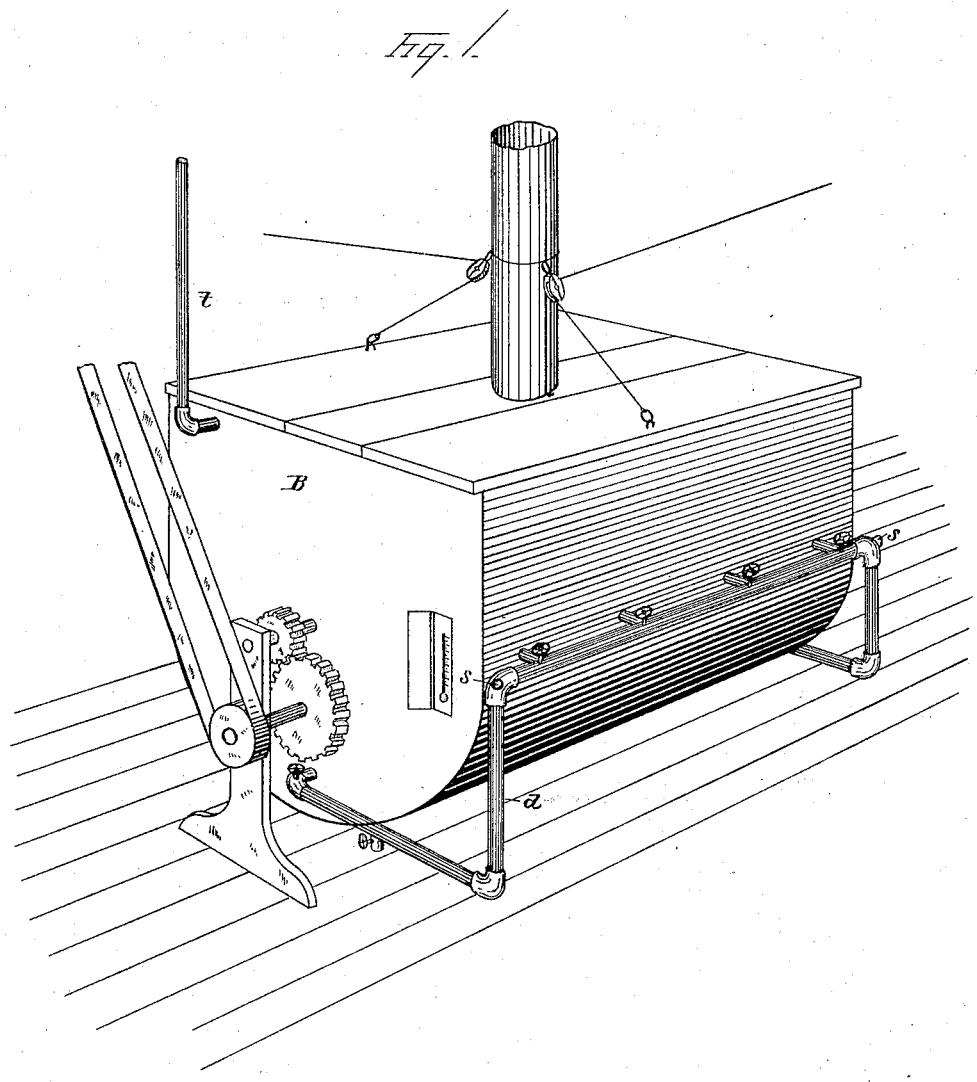

(No Model.) 2 Sheets—Sheet 1.

A. W. BILLINGS.
PROCESS OF MANUFACTURING BEER OR ALE.

No. 324,522. Patented Aug. 18, 1885.

Witnesses
H. R. Dwyer
William Paton

Inventor
A. W. Billings
By Foster & Freeman
Attys.

(No Model.)
2 Sheets—Sheet 2.
A. W. BILLINGS.
PROCESS OF MANUFACTURING BEER OR ALE.
No. 324,522. Patented Aug. 18, 1885.
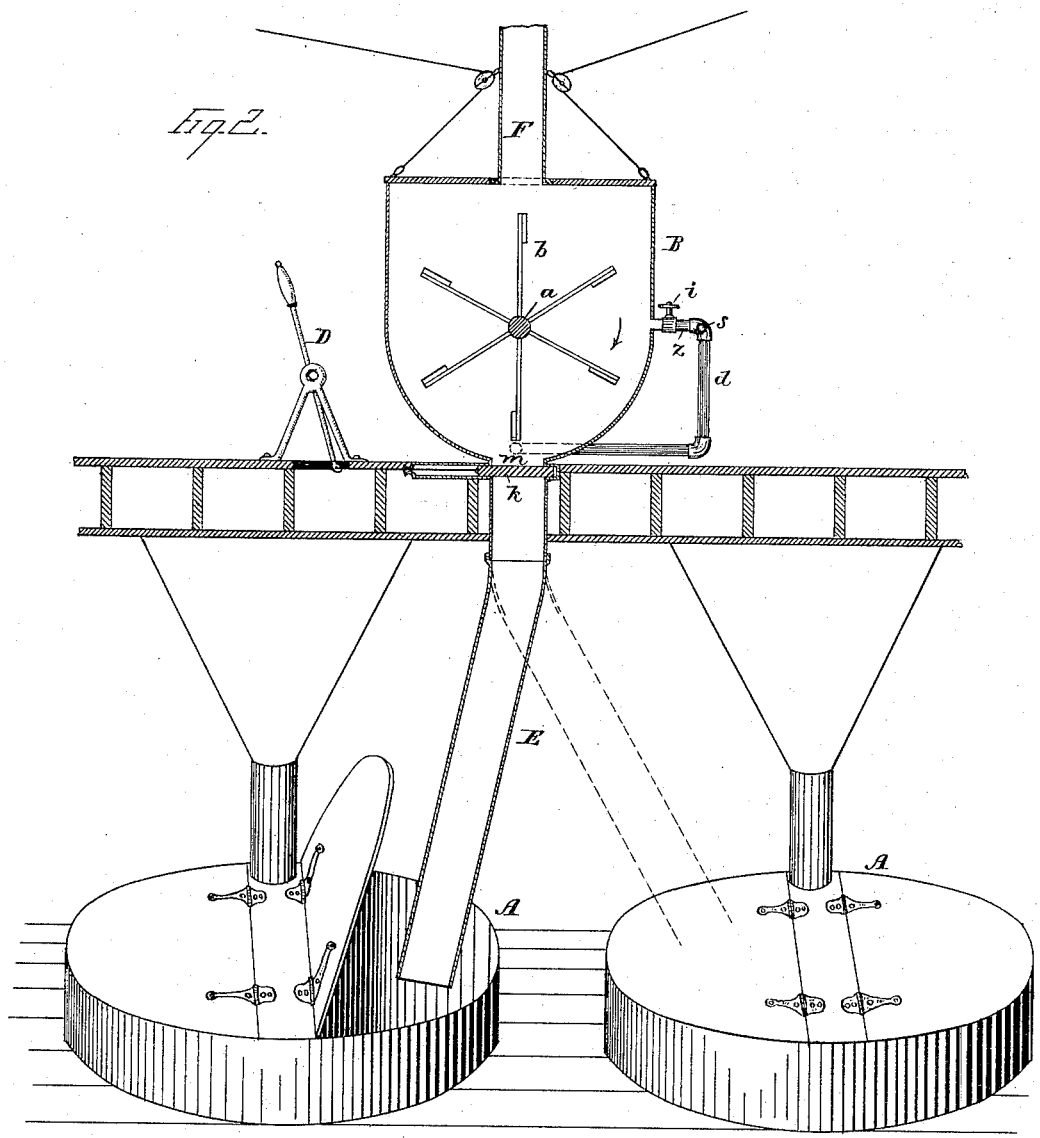
Witnesses
Inventor
A. W. Billings
By Foster & Freeman
Attys.

UNITED STATES PATENT OFFICE.

ANDREW W. BILLINGS, OF BROOKLYN, NEW YORK.

PROCESS OF MANUFACTURING BEER OR ALE.

SPECIFICATION forming part of Letters Patent No. 324,522, dated August 18, 1885.

Application filed May 23, 1883. (No model.)

*To all whom it may concern:*

Be it known that I, ANDREW W. BILLINGS, of Brooklyn, Kings county, New York, have invented certain Improvements in the Process of Manufacturing Beer or Ale, of which the following is a specification.

My invention is an improvement in the manufacture of beer or ale, whereby I am enabled to reduce the quantity of malt and produce a superior article of beer or ale without the use of chemicals or other injurious ingredients, and with but little, if any, increase of time over that required for the ordinary process, and at a great saving in labor and expense.

In carrying out my process I make (preferably at the same time) two mashes, one of malt in the ordinary manner, using the ordinary apparatus, and the other or supplemental mash of corn, rice, or any other kind of raw grain, using apparatus one form of which is illustrated in the accompanying drawings in perspective in Figure 1, and partly in section in Fig. 2.

The raw grain for the supplemental mash is preferably ground or crushed sufficiently fine for the particles to become thoroughly saturated or wet, and about one bushel of the same so ground or crushed is used as an equivalent for from two to three bushels of malt as employed in making the malt-mash, the relative proportions varying with circumstances. The raw grain, ground or crushed, as stated, is then put in with the requisite quantity of water at the temperature of about 112° Fahrenheit, the stirrers being in motion. Then by the injection of live steam directly into the mash the mash is heated to about 210°, bringing the mash to a thick pasty condition, care being taken to avoid boiling, (the starch-cells in the raw grain being thoroughly developed,) and then, the steam being shut off, cold water is injected through a suitable pipe directly into the mash, and its temperature thereby quickly reduced to about 140°, when about four ounces of malt (preferably ground or crushed) to every pound of raw grain used is added and thoroughly mixed through the mash. The operation is at this stage suspended for from one and one-half to two and one-half hours, so as to allow the diastase, which acts on the starch-cells, to convert the starch into sugar, the mash then losing its pasty condition, after which the stirrers are again set in motion, the mash again heated up to about 185° by the injection of live steam, as before, to complete the developement and saccharification of any starch yet unconverted. Then the steam is shut off, the flues opened, and the temperature of the mash reduced to that of the malt-mash, which has meanwhile been prepared, whereupon the two mashes are run together and the subsequent operations are then pursued as in the ordinary brewing.

In the preparation of the raw mash all the malt used as a diastase may be put in at the same time with the raw grain; or there may be a smaller proportion of the malt put in with the raw grain, and a second and larger proportion when the mash has been cooled down to about 140°. I prefer, however, to put the malt in after cooling the mash down to about 140°, as by so doing the diastase has its full effect and its virtues are not destroyed by the temperature of the mash.

I have described the mode of making the raw mash which I have found in practice to be most effective in securing without the use of skilled labor the most complete conversion, gaining the largest amount of extract, at the same time without producing alcohol or developing any of the salts or acids so injurious to yeast and beer, and without setting free the oils, thereby avoiding any corn-like flavor or smell; but the desired results may be secured by preparing the mash in other ways.

In the preparation of the raw mash the heating and cooling may be effected in different ways. I have found, however, that the best results ensue by heating, by injecting live steam directly into the mash, and by cooling by adding cold water, for by these means all loss of time is avoided, far less steam is used, and the entire series of operations (except for the saccharificating) requires but a few minutes.

By thus preparing two mashes, making the raw mash so as to thoroughly extract the saccharine matter, and then mixing the two and pursuing the ordinary brewing operations, I am enabled to substitute a large percentage of raw corn or other grain for the malt otherwise required with a corresponding saving in expense. As the two mashes are simultaneously prepared, there is no loss of time, and the product thus obtained is very desirable, of pure quality, bright, very light golden color without any green tinge, possesses a most agreeable flavor, without any corn-taste whatever, and will keep sound for a longer time than the products of ordinary processes. By thus preparing two mashes I also avoid delays, expense, and liability of injurious effects which would result from treating the entire mass of worts, for it will be seen that a small proportion of the material may be raised and lowered in temperature and otherwise treated much more readily than if the raw grain were introduced into the entire mass of liquor and like operations pursued.

As before stated, care must be taken to avoid boiling or high temperature, as a low temperature will suffice to develop the starch, which is all that is required, while a slightly-higher temperature will cause the mass to be converted into a mush that would not draw off or filter, and will also result in the extraction of oils, &c., which will not only injure the flavor of the product, but will cause the wort to afterward ferment and injure the quality and interfere with the production of the beer. This is especially the case where raw crushed or unbolted grain is used, as is done in carrying out my process. Boiling or heating under pressure also results in the extraction of oils, &c., and formation of alcohol, so that the wort is not clear, and is liable to become ropy and injure the product.

In the apparatus shown in the drawings, A is the ordinary mash-tub in general use upon one floor, and B the supplemental mash-tub, preferably in a higher position. The raw-grain mash is made in the upper tub, the malt-mash in the lower, and at the proper time the upper mash is transferred to the lower. The tub B is preferably of iron, with a curved bottom, and crossed by a shaft, $a$, carrying stirrer-blades $b$, which serve to keep the mash in agitation. The steam is injected from a steam-pipe, $d$, at the sides and ends, so as to be brought in direct contact with the whole body of the mash at once, and the stirrers are rotated so as to aid in carrying the steam downward from the inlet-pipes into and through the body of the mash. Each branch, $z$, is provided with a valve, $i$, arranged as close to the side of the tub as possible, so as to have no room for a deposit which would close the opening, and the angles of the steam-pipe $d$ are provided with suitable caps or plugs, $s$, so arranged that they are readily removed and afford complete access to the pipes for the purpose of removing any obstruction, or thoroughly cleaning when necessary. The discharge-valve $k$ at the outlet $m$, is arranged close to the tub. A lever, D, operates the valve $k$, and a pipe, E, conducts the mash from the tub B to the tub A. A flue, F, carries off all vapors and serves to assist in cooling. Thermometers are arranged at suitable points in the tub B, to enable the temperature of the mash to be ascertained and properly regulated. The injection of the live steam directly into the mash not only quickly heats it, but aids to maintain it in agitation, prevents its baking to the tub, and effects the requisite changes more promptly and with better results than when steam pipes or casings are employed. The cold water is admitted from a pipe, $t$, which is arranged in the top of the tub B, and is perforated to allow a free flow of water, which is thereby evenly distributed through the mash, quickly reducing it to the desired temperature. It is also a material aid in cleaning the tub, and may also be connected with a hot-water supply.

A most important effect of the direct application of the steam and cold water is the reduction of time required for the operations, for I have found that in proportion as the time is reduced I am enabled to secure a better result, and to more uniformly raise and lower the temperature.

I do not here claim the apparatus shown, as it constitutes the subject-matter of a separate application for Letters Patent No. 166,438, filed May 23, 1885, which constitutes a division of this application.

I am aware that it has been proposed to make a raw-grain mash to be mixed with a malt-mash; but in such case the said raw-grain mash was to be heated to a degree that would finally convert the whole into a mush, in which all the soluble parts of the grain were extracted in order that the same might be rich in substances suitable for cattle-feed. By my process I avoid high temperatures and merely heat the grain sufficiently to secure as large a percentage of starch as possible without extracting the oils and other matters, as above described.

I do not limit myself to the use of malt in the making of the raw mash, as other material acting to convert the starch of the grain may be employed; nor do I disclaim features not herein specifically claimed, as they will form the subjects of separate applications for Letters Patent; but

I claim—

1. The within-described mode of making beer or ale, the same consisting in making a malt-mash, making also a mash from raw grain by heating to a temperature below the boiling-point to secure the starch without extracting the oils, and adding malt, and then mixing the two mashes and treating as is usual in beer and ale making, substantially as described.

2. In the manufacture of beer or ale, making a mash of corn, rice, or other raw grain by combining the raw grain with warm water, raising the temperature by the direct injection of live steam to nearly the boiling-point, cooling suddenly by the direct injection of cold water, then adding a small proportion of malt, and after the mash has been allowed to stand again heating by the injection of live steam, substantially as specified.

3. In the manufacture of beer or ale, making a corn-mash by combining the corn, a small proportion of malt, and warm water, raising the temperature to nearly the boiling-point, but without extracting the oils, cooling, and after the mash has been allowed to stand again heating, substantially as specified.

4. In the manufacture of beer or ale, making a corn-mash containing a proportion of malt, and alternately heating and cooling the mash, substantially as and to the degrees herein set forth, and combining with a malt-mash, as specified.

5. In the manufacture of ale or beer, heating and cooling the raw-grain mash by the direct injection of live steam and cold water to raise the temperature nearly to the boiling-point and suddenly lower it, to thoroughly convert the starch, but prevent the extraction of oils and other matters, substantially as and for the purpose set forth.

6. In the process of making ale or beer, treating and mashing raw grain to remove the starch without extracting the oils, adding diastase, and combining the mash thus made with mash made from malt, and treating the two together, as usual in the process of making beer and ale, substantially as described.

In testimony whereof I have signed my name to this specification in the presence of two subscribing witnesses.

ANDREW W. BILLINGS.

Witnesses:
 GEO. FINCK,
 JNO. W. ANDERSON.